United States Patent
Gardiner et al.

(10) Patent No.: US 6,362,286 B1
(45) Date of Patent: Mar. 26, 2002

(54) MOLECULAR WEIGHT REDUCTION OF OLEFIN COPOLYMERS USING LOW-SULFUR OILS

(75) Inventors: James Macfarlane Gardiner, Wantage (GB); Keith James Fenner, Bayside, NY (US); Ralph Joseph Spohn, Woodcliff Lake, NJ (US); Gary W. Ver Strate, Port Saint Lucie, FL (US)

(73) Assignee: Exxon Chemical Patents Inc., Wilmington, DE (US)

( * ) Notice: Subject to any disclaimer, the term of this patent is extended or adjusted under 35 U.S.C. 154(b) by 0 days.

(21) Appl. No.: 09/460,230

(22) Filed: Dec. 13, 1999

(51) Int. Cl.$^7$ .................................................. C08F 8/06
(52) U.S. Cl. .................... 525/370; 525/333.8; 525/371; 525/387; 525/388
(58) Field of Search .................................. 525/370, 371, 525/387, 388

(56) References Cited

U.S. PATENT DOCUMENTS 5,028,666 A * 7/1991 Clarke .......................... 525/388

* cited by examiner

Primary Examiner—Bernard Lipman
(74) Attorney, Agent, or Firm—Walter L. Stumpf; Richard J. Sheridan

(57) ABSTRACT

A method for reducing the molecular weight of olefin copolymers comprises contacting an olefin copolymer and a base oil containing less than about 0.05 wt. % sulfur in the presence of oxygen and at a temperature of at least about 60° C.

6 Claims, No Drawings

MOLECULAR WEIGHT REDUCTION OF OLEFIN COPOLYMERS USING LOW-SULFUR OILS

BACKGROUND OF THE INVENTION

Reduction of the molecular weight of olefin copolymers ("OCP") for use as viscosity index improvers ("VII") in lubricating oils is important to improve the shear stability (measured by a mechanical process well known in the automotive engine oil industry) of the VII beyond that provided by the raw polymer manufactured by the polymer supplier. This molecular weight reduction is needed because some polymer manufacturing processes are unable commercially to manufacture polymer with sufficiently low molecular weight for some VII applications.

Several processes are known for this molecular weight reduction. In the solid (i.e., undiluted polymer) state, the processes are mastication and extrusion, both of which are high shear processes requiring high temperatures (greater than 180–200° C.) and heavy equipment. In the liquid (i.e., polymer diluted in oil) state, the most well known process is high pressure homogenization, which also requires large, powerful machines, but is carried out at relatively low (100° C.) temperatures. Some "thermolysis" processes have also been described, but these also require high temperature oxidation of the polymer in oil solution.

The present invention arises from the observation that normal OCP polymer is less resistant to molecular weight breakdown at modest temperatures when dissolved in low-sulfur base oils (e.g., API Group II, Group III). This gives an opportunity to reduce polymer molecular weight (using an oxidative, free radical or catalytic process) under much milder conditions than when dissolved in, for example, an API Group I normal solvent-extracted base oil, in which the natural antioxidancy of the sulfur compounds in the oil is thought to inhibit the breakdown process of the polymer. Milder conditions imply lower temperatures (60–120° C.), lighter equipment such as normal dissolving equipment with no special high shearing devices, shorter cycle times, and less oxidative stress on the reactants resulting in lighter color products. All of these benefits can be valuable commercially.

Thus, the discovery that molecular weight reduction of OCP occurs rapidly in low sulfur base oils at modest temperatures opens up several process and commercial opportunities for the more convenient manufacture of OCP VII solutions of suitable molecular weight/shear stability, using commonly available equipment and widely-encountered operating conditions.

SUMMARY OF THE INVENTION

In accordance with the present invention, there is provided a method for reducing the molecular weight of olefin copolymers comprising contacting said olefin copolymer and a base oil containing less than about 0.05 wt. % sulfur in the presence of oxygen and at a temperature of at least about 60° C. The olefin copolymer is preferably an ethylene alpha-olefin copolymer, more preferably an ethylene-propylene copolymer. The olefin copolymer may also be contacted with a catalyst or accelerator that promotes oxidation of the copolymer, such as metals, metal salts, metal complexes, peroxides or hydroperoxides.

DETAILED DESCRIPTION OF THE INVENTION

The olefin copolymers useful in the present invention are those that are composed of only carbon and hydrogen atoms and contain any weak carbon-hydrogen bond in their backbone. This weak carbon-hydrogen bond is susceptible to oxidation, causing degradation of the copolymer and a reduction in molecular weight. Thus, any olefin copolymer that has such a weak carbon-hydrogen bond is within the scope of this invention. Typical of copolymers containing this weak bond are those having a tertiary carbon atom in the copolymer backbone, including, but not limited to, ethylene-propylene copolymers, and those copolymers that have allylic bonds in their backbone.

Examples of the olefin copolymers useful in this invention include, but are not limited to, ethylene alpha-olefin copolymers. Typically, these copolymers have an average ethylene content of between 20 and 85 weight percent as measured by ASTM D 3900-94A. They are made using at least one alpha-olefin represented by the formula $H2C=CHR^1$ where $R^1$ is an alkyl group of from 1 to 18 carbon atoms. Optionally, one or more conjugated or non-conjugated diolefins at a concentration of from 0 to 20 mole percent, based on the amount of ethylene and alpha-olefin present, may be present in the copolymer. The copolymers typically have a number average molecular weight, Mn, of from above 15,000 to about 500,000 corresponding to the Mooney viscosity range of about 0.5 to about 500 (1+4, 125° C., measured according to ASTM D 1646). Examples of ethylene alpha-olefin copolymers include, but are not limited to, ethylene-propylene copolymers and terpolymers of ethylene, propylene and a $C_4-C_{20}$ olefin such as 1-butene, isobutylene, 1-hexene, or 1-decene. Other useful polymers include copolymers of ethylene, propylene and a polyene containing two or more carbon-carbon double bonds and about 2 to about 20 carbon atoms. Examples of such polyenes include isoprene, 1,3-butadiene, 1,4-hexadiene, dicyclopentadiene, bicyclo(2,2,1)hepta-2,5-diene (norbornadiene) as well as alkenyl norbornenes wherein the alkenyl group contains 1–20 carbon atoms and preferably 1–12 carbon atoms. Examples of some of the latter monomers include 5-methylene-2-norbornene, 5-ethylidene-2-norbornene, vinyl norbornene, as well as alkyl norbornadienes. Still other olefin copolymers include copolymers of an olefin, e.g., ethylene, and styrene.

The olefin copolymers preferably are oil soluble, or at least dissolvable in oil with the aid of a solvent, or are stably dispersible in oil. Oil soluble, dissolvable, or stably dispersible, as used herein, does not necessarily mean that the copolymers are soluble, dissolvable, miscible, or capable of being suspended in oil at all proportions. It does mean, however, that the copolymers are soluble or stably dispersible in oil to an extent that, after molecular weight reduction, the resulting copolymers are suitable for use as viscosity index improver additives or as precursors for dispersant and multi-functional viscosity index improver additives in lubricating oil compositions.

The base oils useful in the present invention are those that have a sulfur content of less than about 0.05 wt. %, preferably less than 0.03 wt. %. Typical of such oils are American Petroleum Institute ("API") Group II and Group III base oils. In an API publication entitled "Engine Oil Licensing and Certification System", API, fourteenth edition, Dec. 1996, addendum Dec. 1, 1998 "base oil" is defined as the base stock or blend of base stocks used in an API-licensed oil. "Base stock" is defined as a lubricant component that is produced by a single manufacturer to the same specifications (independent of feed source or manufacturer's location); that meets the same manufacturer's specification; and that is identified by a unique formula, product identification number, or both. Base stocks may be manufactured using a variety of different processes including, but not limited to distillation, solvent refining, hydrogen processing, oligomerization, esterification and rerefining. API Group II base stocks are defined as base stocks containing greater than or equal to 90 percent saturates and less than or equal to 0.03 percent sulfur, and having a viscosity index greater than or equal to 80 and less than 120. API Group III base stocks are defined as base stocks containing greater than or equal to 90 percent saturates and less than or equal to 0.03 percent sulfur, and having a viscosity index greater than or equal to 120. The saturates content is determined by ASTM D 2007, viscosity index by ASTM D 2270, and sulfur content by any one of ASTM D 2622, ASTM D 4294, ASTM D 4927 or ASTM D 3120. The API publication is incorporated by reference herein in its entirety.

The molecular weight reduction of the olefin copolymer occurs through an oxidation reaction. Thus, the copolymer must be in contact with oxygen. The source of the oxygen is not critical, however. In some cases, trace amounts of oxygen may be present in either the oil, the copolymer or both. Also, some olefin copolymers contain small amounts of hydroperoxides which can serve as an oxygen source. However, it is preferred that the olefin copolymer and oxygen be brought into contact by dissolving or dispersing the olefin copolymer in the low-sulfur oil, and then introducing air into the mixture. This can be accomplished in any suitable manner, such as injecting air into the mixture, or by mixing in such a way that air is introduced into the copolymer/oil mixture. An advantage of the present invention is that this mixing need not be severe, i.e. high shear is not required for reduction of the olefin copolymer's molecular weight.

Various catalysts and/or accelerators can be employed to accelerate the molecular weight reduction of the olefin copolymers, it being noted, however, that such catalysts or accelerators are not necessary for molecular weight reduction to occur. The catalysts include metals, metal salts or complexes such as copper, vanadium, chromium, manganese, nickel, iron, cobalt, molybdenum and their salts and complexes such as oleates, naphthenates, octoates, carboxylates, stearates and other long chain, oil soluble, organic acid salts. Other catalysts and/or cocatalysts include the peroxides such as dibenzoyl peroxide, dioctyl peroxides, and dialkyl peroxides. Other suitable peroxide catalysts are disclosed in U.S. Pat. No. 3,313,793, incorporated herein by reference.

The period of time that is generally required to achieve the desired reduction in molecular weight will vary depending upon the temperature employed, type of mixer (if any) used, catalyst (if any), and the particular olefin copolymer used.

It has been found that, by using the low-sulfur base oils of this invention, the temperature at which molecular weight reduction of the olefin copolymer can be achieve is greatly reduced. Previous method for molecular weight reduction required temperatures of about 100° C. to about 200° C., depending upon the particular method employed. However, when the low-sulfur base oils of this invention are employed, molecular weight reduction occurs at temperatures as low as 60° C. Higher temperatures, e.g., 60–120° C., can be used if desired.

This invention will be further understood by reference to the following illustrative examples. The examples include preferred but non-limiting embodiments of the invention.

EXAMPLE 1

A narrow molecular weight, ethylene-propylene copolymer (containing about 40–60% ethylene) is blended with a base oil containing less than 0.05% sulfur (Chevron 100R, Chevron U.S.A. Inc). The blend is maintained at 100° C., and its viscosity measured periodically. The results are indicated below.

| Time (Hrs.) | Viscosity at 100° C. (cSt) |
|---|---|
| 0 | 2779 |
| 43.25 | 1714 |
| 43.75 | 1605 |
| 47.25 | 1400 |
| 48.5 | 1366 |

The above results indicate that the molecular weight of the copolymer was reduced over time.

Comparative Example A

The procedure of Example 1 is repeated, except that the oil used is EUSA FN 1365 (Exxon USA) which typically contains about 0.3 wt. % sulfur. The viscosity results are shown below.

| Time (Hrs.) | Viscosity at 100° C. (cSt) |
|---|---|
| 0 | 3174 |
| 1 | 3180 |
| 18 | 2968 |
| 22 | 2903 |

The viscosity results indicate that there is little reduction in the molecular weight of the olefin copolymer.

EXAMPLE 2

Comparative Example B

The procedure of Example 1 is repeated, except that an olefin copolymer similar to, but not the same as, the copolymer of Example 1 is used. The viscosity results are shown below.

| Time (Hrs.) | Example 2<br>Viscosity @ 100° C. (cSt)<br>Chevron 100R Oil | Comp. Example B<br>Viscosity @ 100° C. (cSt)<br>EUSA FN 1365 Oil |
|---|---|---|
| 0 | 508 | 622 |
| 18 | 463 | 614 |
| 24 | 456 | 610 |
| 48 | 420 | 603 |

The viscosity results indicate a significant decrease in the molecular weight of the copolymer when low-sulfur oil (Chevron 100R) is used, but not when a higher sulfur content oil (EUSA FN 1365) is used.

What is claimed is:

1. A method for reducing the molecular weight of olefin copolymers comprising contacting said olefin copolymer and a base oil containing less than about 0.05 wt. % sulfur in the presence of oxygen and at a temperature of at least about 60° C.

2. The method of claim 1 wherein the olefin copolymer is an ethylene alpha-olefin copolymers.

3. The method of claim 2 wherein the olefin copolymer is an ethylene-propylene copolymer.

4. The method of claim 1 wherein the olefin copolymer and the base oil are mixed such that air is introduced into the mixture.

5. The method of claim 1 wherein the olefin copolymer is contacted with a catalyst or accelerator that promotes oxidation of the copolymer in an amount sufficient to cause oxidation of the olefin copolymer.

6. The method of claim 5 wherein the catalyst or accelerator is selected from the group consisting of metals, metal salts, metal complexes, peroxides and hydroperoxides.

* * * * *